T. W. BROWN.
PRESSURE REGULATOR.
APPLICATION FILED OCT. 31, 1910.

982,123.

Patented Jan. 17, 1911.
2 SHEETS—SHEET 1.

T. W. BROWN.
PRESSURE REGULATOR.
APPLICATION FILED OCT. 31, 1910.

982,123.

Patented Jan. 17, 1911.
2 SHEETS—SHEET 2.

Witnesses:

Inventor
Tom William Brown

UNITED STATES PATENT OFFICE.

TOM WILLIAM BROWN, OF LONDON, ENGLAND, ASSIGNOR OF ONE-HALF TO FREDERICK CHARLES TILLEY, OF LONDON, ENGLAND.

PRESSURE-REGULATOR.

982,123.

Specification of Letters Patent. Patented Jan. 17, 1911.

Application filed October 31, 1910. Serial No. 590,002.

*To all whom it may concern:*

Be it known that I, TOM WILLIAM BROWN, a subject of the King of Great Britain, residing at London, England, have invented certain new and useful Improvements in Pressure-Regulators, of which the following is a specification.

This invention relates to improvements in pressure regulators intended for use especially in connection with air or gas pumps and blowers, and a supply main in which the pressure of the fluid to be delivered to the burners or other apparatus is maintained at some normal determined degree.

For certain operations the normal determined degree of pressure in the supply main may be all that is required. For other operations a higher degree of pressure is required, in which case the pump or blower is put into action to raise the pressure to the necessary degree. Pressure regulating devices have been proposed which adapt themselves automatically to the delivery of fluid, either at its normal supply pressure or at an increased pressure, as when the pump or blower is in operation, and such arrangements, moreover, embody means in the nature of an automatic valve controlled by-pass for relieving excess of pressure by temporarily establishing a shunt and idle circulation, so to speak, about the motor.

The present invention relates more particularly to the class of devices defined in the foregoing paragraph and its object is to provide an improved pressure regulator for use in the environments stated which shall be of self-contained nature, of very simple and inexpensive construction, and of high efficiency.

An embodiment of the invention is illustrated in the accompanying drawings, wherein—

Figure 1:
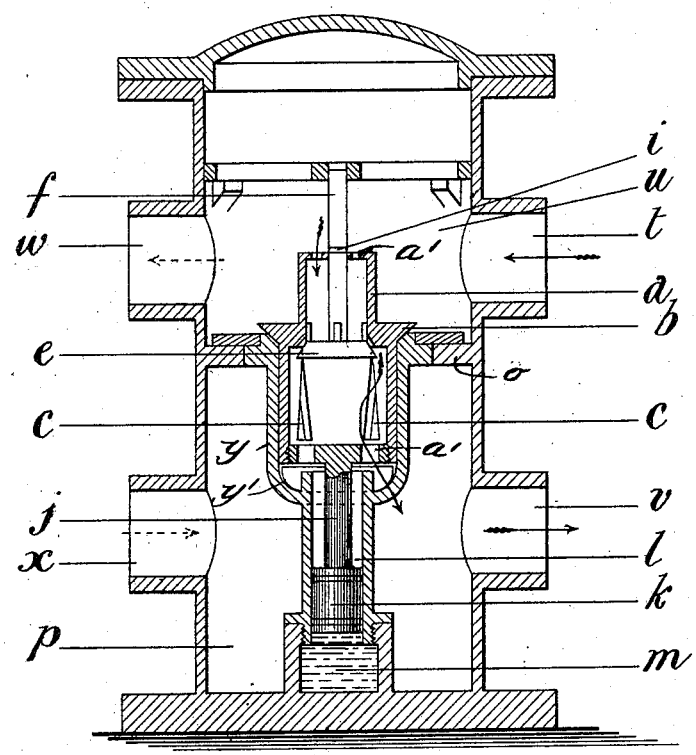
Figure 2:
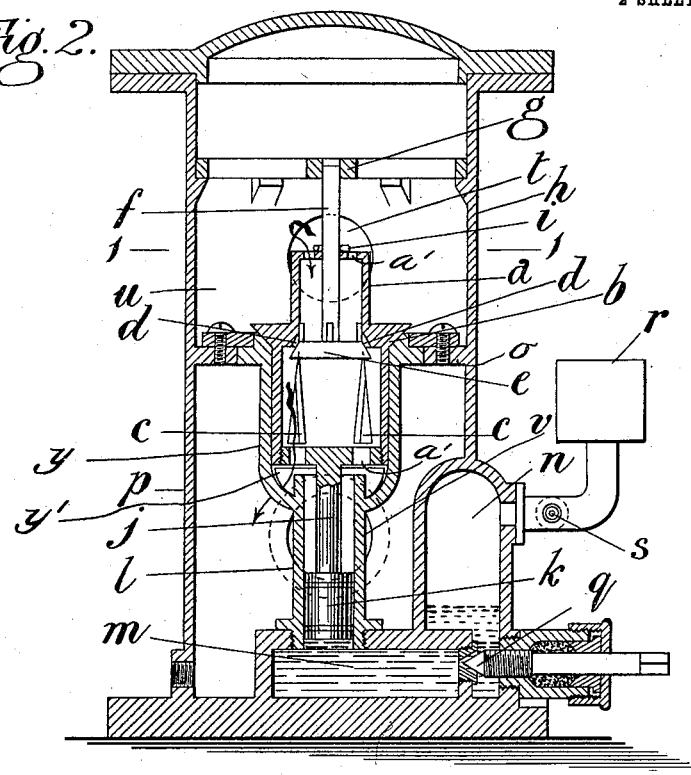
Figure 3:
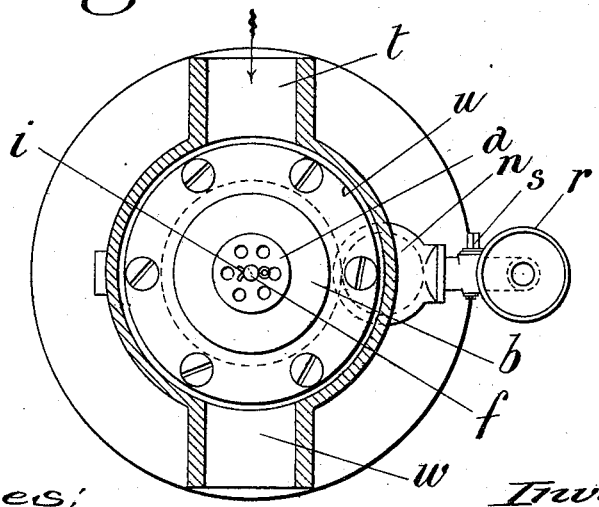

Figure 1 is a central vertical sectional view of the improved regulator; Fig. 2 is a similar view in a plane at right angles to the plane of Fig. 1; and Fig. 3 is a horizontal sectional view on the line 1—1 of Fig. 2.

Similar characters of reference designate corresponding parts throughout the several views.

The operative parts of the present regulator are inclosed in a casing A at one side of which connections $t$ and $v$ are provided and at the opposite side of which connections $w$ and $x$ are provided. The connections $t$ and $w$ are located in the upper portion of the casing and communicate with a chamber $u$ while the connections $v$ and $x$ are located in the lower portion of the casing and communicate with a chamber $p$. The connection $t$ is coupled to the supply main, the connection $v$ is coupled to the delivery main, the connection $w$ is coupled to the suction side of the pump or blower (not shown) and the connection $x$ is coupled to the pressure side of the pump or blower. The chambers $u$ and $p$ are separated by a horizontal partition $o$ having a central opening in which is permanently fitted a barrel $y$. The barrel $y$ serves as a guide for a vertically movable valve member $a$, the latter having a valve flange $b$ which coöperates with a seat formed at the upper end of the barrel $y$. The valve member $a$ has the general form of a hollow cylinder, the flange $b$ being provided midway of its length and the ends of the cylinder being provided with openings $a'$. That portion of the valve member which is disposed in the barrel $y$ is provided with vertical slots $c$ which preferably taper upwardly. The flange $b$ has its inner face formed as a seat $d$ for a valve $e$. The latter is carried at the lower end of a stem $f$ which extends through the upper end wall of the member $a$ and through a central opening in a web or spider $g$ supported on a flange $h$ within the casing A. In the absence of pressure in the chamber $p$ the valve $e$ acts by gravity to assume an open position, being held at a proper location by a pin $i$ which extends through the stem $f$ and rests upon the upper end of the member $a$.

The barrel $y$ is provided at a point below the member $a$ with openings $y'$. In the absence of pressure in the chamber $p$ the valve $e$ is open, as above stated, and gas or air is delivered to the burners or other apparatus at the pressure in the supply main, the gas or air flowing, as indicated by the full line arrows, from the supply main, through the openings $a'$ in the upper end of the member $a$, past the valve $e$, through the openings $a'$ in the lower end of the member $a$, through the openings $y'$ and out through the connection $v$. However, in case the air or gas is being delivered at increased pressure, as when the pump or blower is in operation, the pressure in the chamber $p$ closes the valve $e$ and consequently the communication of the chambers $u$ and $p$ is interrupted. The air or gas now flows from the inlet connection $t$, across the chamber $u$, through the connection $w$ to the suction side of the pump or blower, the latter then acting to force the air or gas thus delivered to its suction side through the connection $x$, across the chamber $p$, and out through the connection $v$ to the apparatus or burners. In case the pressure in the chamber $p$ exceeds the degree determined upon so that the air or gas is delivered under too great pressure to the apparatus or burners, this excess of pressure in the chamber $p$ acting on the under face of the valve $e$ will cause an elevation of the valve member $a$ whereby the flange $b$ is raised from its seat and a temporary communication of the chambers $p$ and $u$ is established. In this case, in addition to the circulation described in the preceding paragraph, a shunt or idle circulation, so to speak, is temporarily set up whereby the pressure at the burners or apparatus is relieved. With the valve member $a$ raised in the manner indicated, a portion of the pressure in the chamber $p$ flows through the openings $y'$, the adjacent openings $a'$, and the portions of the slots $c$ within the chamber $u$, past the flange $b$, into the chamber $u$, and through the connection $w$ to the suction side of the pump or blower, being returned by the latter through the connection $x$ to the chamber $p$. This circuit is repeated until the pressure in the chamber $p$ falls to the degree determined upon, in which case the valve member $a$ descends by gravity to its normal position wherein its flange $b$ occupies the seat provided therefor and the shunt or idle circulation referred to is disestablished.

To regulate the pressure at which the valve member $a$ will be raised, as well as to brake the movements of said valve member and consequently secure an action of said valve member which is noiseless and devoid of vibration, the following arrangement is preferably employed.

The barrel $y$ has formed at its lower end a cylinder $l$ in which works a piston $k$ provided at the lower end of a stem $j$ which is attached to and depends from the valve member $a$. The cylinder $l$ is set upon and communicates with a box $m$ which has valve controlled communication with a chamber $n$, arranged within but independent of the chamber $p$, and connected to a reservoir $r$, the connection being provided with a valve $s$. The communication of the chamber $n$ and the box $m$ is controlled by a needle valve $q$ by virtue of which the rate of flow of the fluid or liquid material in the chamber $n$ to the box $m$ may be regulated. Obviously when the valve member $a$ is raised the fluid in box $m$ in conjunction with the piston $k$ puts a drag, so to speak, on the movement of said valve member, which drag is greater or less in accordance with whether the valve $q$ is nearer or more remote from its seat. In like manner when the valve member $a$ descends the fluid or liquid in the box $m$ cushions the movements of said valve member to a greater or less degree in accordance with the position of the valve $q$ to provide for a more or less retarded back flow of the fluid or liquid medium. The movements of the valve member $a$ are thus rendered steady, certain, and noiseless.

When the operation of the pump or blower is stopped, the valve $e$ drops to its normal position shown in the drawings and the gas passes to the burners under normal pressure, as has been described.

Having fully described my invention, I claim:

1. A regulator of the type set forth, comprising a casing having an upper chamber and a lower chamber, the upper chamber having a supply main connection and a connection for the suction side of a pump and the lower chamber having a delivery main connection and a connection for the pressure side of said pump, the chambers being separated by a partition which has a central opening, a depending barrel fitted in the opening, a valve member of cylindrical form arranged within the barrel and coöperating with the latter as a seat, the valve member having openings in its upper and lower ends and also having vertical slots which do not normally extend beyond the barrel, the valve member being further provided with an interior valve seat, and a gravity valve which rests normally in an open position and coöperates with said interior valve seat.

2. A regulator of the type set forth, comprising a casing having an upper chamber and a lower chamber, the upper chamber having a supply main connection and a connection for the suction side of a pump and the lower chamber having a delivery main connection and a connection for the pressure side of said pump, the chambers being separated by a partition which has a central opening, a depending barrel fitted in the opening, a valve member of cylindrical form arranged within the barrel and coöperating with the latter as a seat, the valve member having openings in its upper and lower ends and also having vertical slots which do not normally extend beyond the barrel, the valve member being further provided with an interior valve seat, a gravity valve which rests normally in an open position and coöperates with said interior valve seat, the barrel being formed with a depending cylinder, a fluid containing box with which the cylinder communicates, a chamber containing fluid which is supplied to the box, a needle valve controlling the communication of the box and the chamber, a stem depending from the valve member, and a piston carried by the stem and working in the cylinder.

In testimony whereof I have hereunto set my hand in presence of two subscribing witnesses.

TOM WILLIAM BROWN.

Witnesses:
   LYNWOOD A. GARDNER,
   R. I. WILLIAMS.